United States Patent
Taniguchi et al.

(10) Patent No.: US 11,038,453 B2
(45) Date of Patent: Jun. 15, 2021

(54) ROTATING ELECTRIC MACHINE DRIVE SYSTEM

(71) Applicant: DENSO CORPORATION, Kariya (JP)

(72) Inventors: Makoto Taniguchi, Kariya (JP); Takumi Inoue, Kariya (JP); Kazushige Okumoto, Kariya (JP); Akira Fukushima, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/739,230

(22) Filed: Jan. 10, 2020

(65) Prior Publication Data

US 2020/0162002 A1 May 21, 2020

Related U.S. Application Data

(63) Continuation of application No. PCT/JP2018/022952, filed on Jun. 15, 2018.

(30) Foreign Application Priority Data

Jul. 14, 2017 (JP) .............................. JP2017-138049

(51) Int. Cl.
*H02P 21/30* (2016.01)
*H02P 21/22* (2016.01)
(Continued)

(52) U.S. Cl.
CPC .............. *H02P 21/30* (2016.02); *H02P 21/22* (2016.02); *H02P 25/22* (2013.01); *H02P 27/12* (2013.01);
(Continued)

(58) Field of Classification Search
USPC ......................................................... 318/560
See application file for complete search history.

(56) References Cited

U.S. PATENT DOCUMENTS

2003/0048086 A1\* 3/2003 Takahashi ......... H02M 7/53803
318/430
2006/0038531 A1\* 2/2006 Wakabayashi .......... H02P 29/50
318/807
(Continued)

FOREIGN PATENT DOCUMENTS

| JP | S59-2579 A | 1/1984 |
| JP | 2006-287990 A | 10/2006 |
| JP | 2017-103910 A | 6/2017 |

OTHER PUBLICATIONS

Sep. 11, 2019 International Search Report issued in Application No. PCT/JP2018/022952.
(Continued)

*Primary Examiner* — Bentsu Ro
(74) *Attorney, Agent, or Firm* — Oliff PLC

(57) ABSTRACT

A rotating electric machine drive system includes: a rotating electric machine equipped with: a rotor having one magnetic pole configured by permanent magnets, and a salient pole portion that is magnetically convex in a radial direction; and a stator wound with a multiphase stator winding; an inverter for supplying electric power to the stator winding; and a control unit for controlling energization current of the inverters. The control unit performs energization control of the stator winding such that a fundamental wave current at a fundamental frequency synchronized with a rotational speed of the rotor, and a harmonic current that is triple the fundamental frequency flow in the stator winding, and such that energization of the harmonic current generates a stator magnetic field having a specified lead phase or delay phase with respect to a third-order magnetic field of the rotor.

14 Claims, 8 Drawing Sheets

(51) Int. Cl.
*H02P 25/22* (2006.01)
*H02P 27/12* (2006.01)

(52) U.S. Cl.
CPC ...... *H02P 2207/05* (2013.01); *H02P 2209/01* (2013.01)

(56) References Cited

U.S. PATENT DOCUMENTS

| | | |
|---|---|---|
| 2006/0113858 A1 | 6/2006 | Hino et al. |
| 2014/0340012 A1* | 11/2014 | Aiba ............... B60L 15/08 318/400.15 |
| 2015/0200614 A1* | 7/2015 | Diaz Reigosa ....... H02P 29/662 318/400.21 |
| 2016/0028340 A1* | 1/2016 | Nakai ............... H02P 21/05 318/400.02 |
| 2017/0104376 A1 | 4/2017 | Nakagawa et al. |

OTHER PUBLICATIONS

Aoyama, Masahiro et al. "Preliminary Study of Flux Intensifying PM Motor with Variable Leakage Magnetic Flux Technique". H 29 National Conference of the Institute of Electrical Engineers. 2017.

* cited by examiner

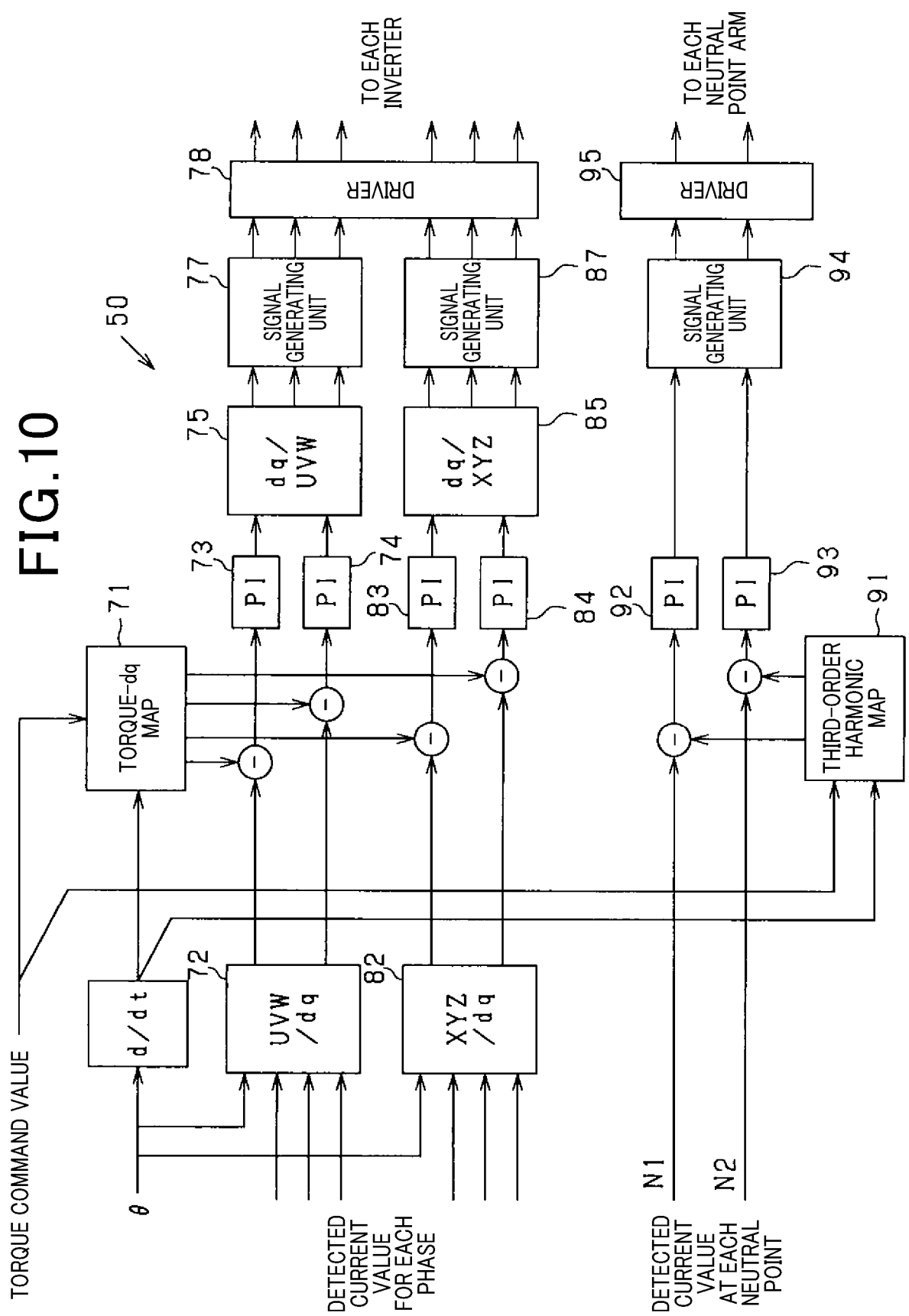

ROTATING ELECTRIC MACHINE DRIVE SYSTEM

This application is the U.S. bypass application of International Application No. PCT/JP2018/022952 filed Jun. 15, 2018 which designated the U.S. and claims priority to Japanese Patent Application No. 2017-138049, filed Jul. 14, 2017, the contents of which are incorporated herein by reference.

BACKGROUND OF THE INVENTION

Technical Field

The present disclosure relates to a drive system for a rotating electric machine.

Description of the Related Art

In recent years, for example, for the purpose of tightening $CO_2$ emission regulations, the development of electrification in automobiles has been increasingly accelerated, and various proposals have been made for automobile motors. In current mainstream design methods, permanent magnet motors (PM motors) that make heavy use of rare earth magnets are employed in order to increase energy density in a limited mounting space.

SUMMARY

The present disclosure provides a drive system for a rotating electric machine that is able to increase torque in the rotating electric machine in which a third-order harmonic magnetic field is generated.

A first example of the present disclosure provides a drive system for a rotating electric machine equipped with: a rotor having one magnetic pole configured by a plurality of permanent magnets, and a salient pole portion that is magnetically convex in a radial direction in a central portion between the plurality of permanent magnets in the one magnetic pole; and a stator wound with a multiphase stator winding. The rotating electric machine includes an inverter for supplying electric power to the stator winding; and a control unit for controlling energization current of the inverters.

The control unit performs energization control of the stator winding such that a fundamental wave current at a fundamental frequency synchronized with a rotational speed of the rotor, and a harmonic current that is triple the fundamental frequency flow in the stator winding, and such that energization of the harmonic current generates a stator magnetic field having a specified lead phase or delay phase with respect to a third-order magnetic field of the rotor.

BRIEF DESCRIPTION OF THE DRAWINGS

The above objects and other objects, features, and advantages of the technique according to the present disclosure will become more apparent from the following detailed description with reference to the accompanying drawings.

In the accompanying drawings:

FIG. 10 is a functional block diagram illustrating control processing by the control device in a second embodiment.

DETAILED DESCRIPTION OF THE PREFERRED EMBODIMENTS

Figure 1:
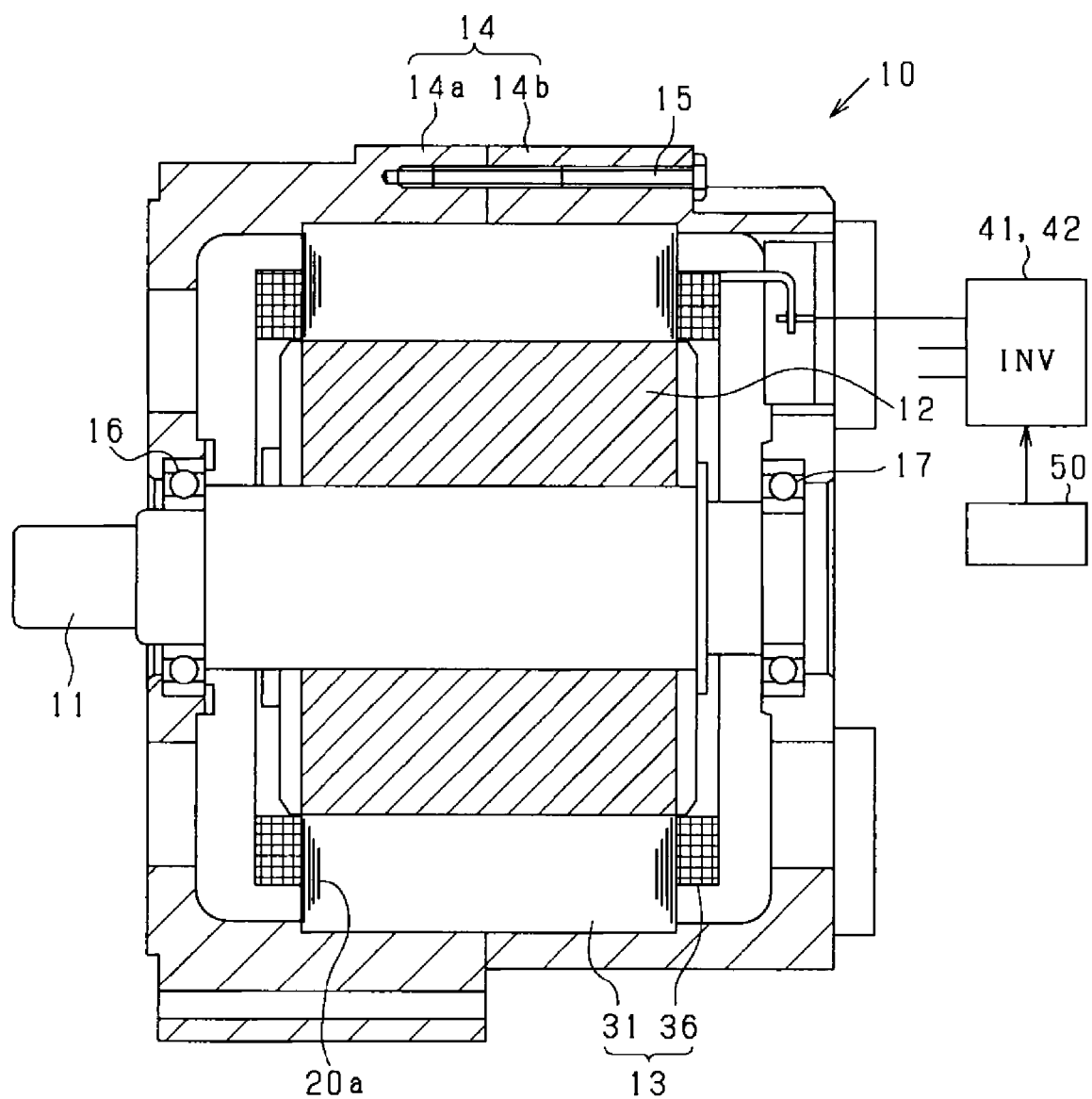
FIG. 1 is a vertical cross-sectional view of a rotating electric machine.

According to the above-described conventional type of PM motor, the induced voltage in the stator winding increases as the rotational speed increases, so there is a problem in that the induced voltage significantly influences the power supply voltage and current cannot flow. Therefore, research is being widely conducted to effectively apply so-called field weakening control that, by adjusting the magnetic field of the stator winding, weakens the magnetic flux of the permanent magnet that is the source of back electromotive force.

For example, in Non-Patent Literature ("Preliminary Study of Flux Intensifying PM Motor with Variable Leakage Magnetic Flux Technique", Masahiro Aoyama, Kazukiyo Nakajima, Toshihiko Noguchi, 2017 Annual Conference of the Institute of Electrical Engineers of Japan, Paper No. 5-001), attempts are introduced in which, by providing a magnetic salient pole at the center or the so-called d-axis of the magnetic pole of the motor, the reaction magnetic flux from the stator is able to easily penetrate the rotor magnetic pole, and field weakening control may be performed efficiently. In other words, since the salient pole having a small magnetic resistance is exposed on the d-axis surface, it becomes easy to receive a reaction magnetic flux from the stator. Therefore, in Non-Patent Literature 1, when the stator current is passed at an appropriate phase, the stator reaction magnetic flux cancels out the magnetic flux generated by the permanent magnet, and the effect of field weakening is enhanced.

The authors of Non-Patent Literature state that in a case where the magnetic pole of the rotor has that characteristic shape, the fundamental wave component of the magnetic flux generated by the permanent magnet is lowered, and a third-order harmonic component will be generated, which is not preferable. Therefore, the authors of Non-Patent Literature are searching for a magnetic pole shape that will reduce the third-order harmonic as much as possible. On the other hand, the inventors of the present application are focusing on extracting the energy of the third-order harmonic magnetic field as an axial torque, and have been examining this aspect.

Hereinafter, embodiments will be described with reference to the drawings. The rotating electric machine in the embodiments is used as a vehicle power source, for example. However, the rotating electric machine may be widely used for industrial use, vehicle use, ship use, aircraft use, home appliance use, OA equipment use, game machine use, and the like. Note that in each of the following embodiments, parts that are the same or equivalent to each other are given the same reference numbers in the drawings, and a description of parts having the same reference numbers is used.

First Embodiment

Figure 2:
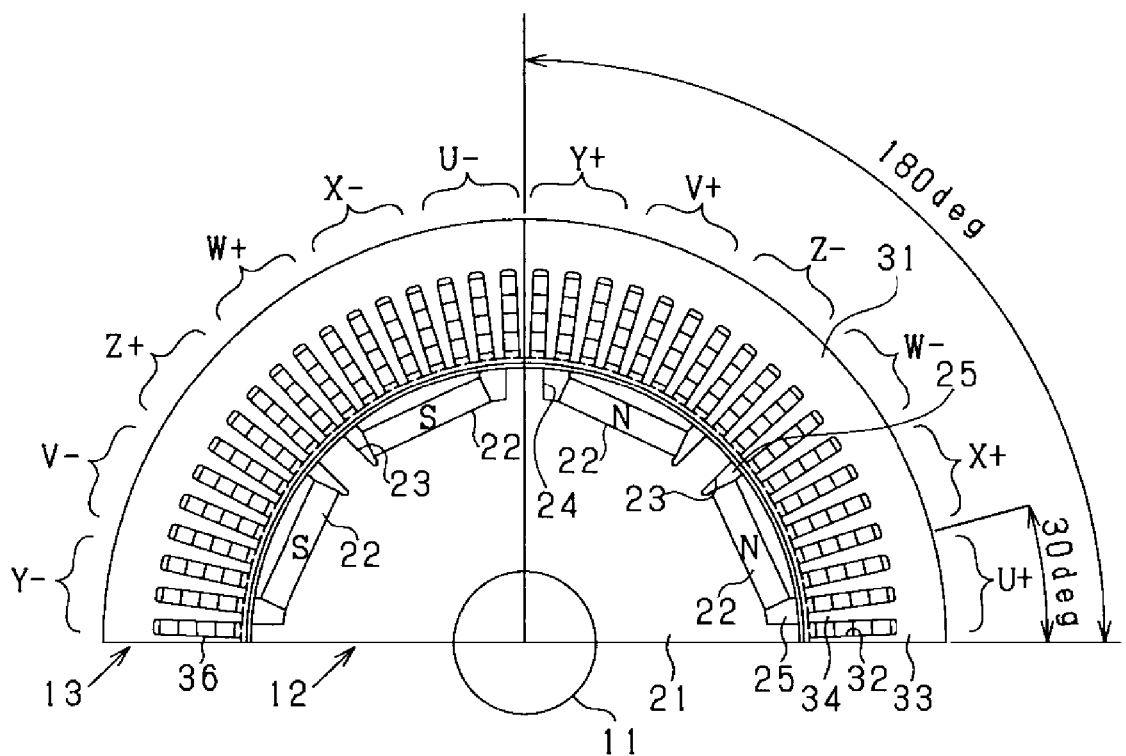
FIG. 2 is a horizontal cross-sectional view illustrating a rotor and a stator core.

The rotating electric machine 10 according to the present embodiment is an inner rotor type (inner rotation type) multiphase AC motor, and an outline thereof is illustrated in FIG. 1 and FIG. 2. FIG. 1 is a vertical cross-sectional view in a direction along a rotating shaft 11 of the rotating electric machine 10, and FIG. 2 is a cross-sectional view illustrating a half of a horizontal cross section of a rotor 12 and a stator 13 in a direction orthogonal to the rotating shaft 11. In the following description, the direction in which the rotating shaft 11 extends is referred to as the axial direction, the direction extending radially from the rotating shaft 11 is referred to as the radial direction, and the direction extending circumferentially around the rotating shaft 11 is referred to as the circumferential direction.

The rotating electric machine 10 includes a rotor 12 fixed to the rotating shaft 11, a stator 13 provided at a position surrounding the rotor 12, and a housing 14 that accommodates the rotor 12 and the stator 13. The rotor 12 and the stator 13 are arranged coaxially. The housing 14 has a pair of bottomed cylindrical housing members 14a,14b, and in a state of being joined at the openings thereof, the housing members 14a,14b are integrally fastened together by bolts 15. The housing 14 is provided with bearings 16, 17, and the rotating shaft 11 and the rotor 12 are rotatably supported by the bearings 16, 17.

The rotor 12 has a rotor core 21, and a plurality of permanent magnets 22 are arranged and provided side by side in the circumferential direction around the outer circumferential portion of the rotor core 21 (in other words, on the side facing the inner circumferential portion of the stator 13 in the radial direction). The rotor core 21 is configured by layering a plurality of electromagnetic steel plates in the axial direction and fixing them by caulking or the like.

The rotor core 21 has two permanent magnets 22 embedded every electrical angle of 90 degrees for each 180-degree magnetic pole, and a salient pole portion 23 that is magnetically convex in the radial direction is provided in the central part between two permanent magnets 22 inside one magnetic pole. In FIG. 2, the two permanent magnets 22 on the right side and the two permanent magnets 22 on the left side have opposite polarities, and a salient pole portion 23 is provided in each of these magnetic poles. In this case, for example, a d-axis salient pole is provided, for example, between the two permanent magnets 22 on the right side, and an anti-d axis salient pole is provided between the two permanent magnets 22 on the left side.

In addition, a salient pole portion 24 as a second salient pole portion is provided between the poles where the polarity is switched, and this is a q-axis salient pole. The permanent magnets 22 and the salient pole portions 23, 24 are spaced apart from each other in the circumferential direction, and that separated portion is a space portion 25. In the rotor core 21, convex portions are formed on the electromagnetic steel plates, and salient pole portions 23, 24 are formed by layering each of the convex portions on the plurality of electromagnetic steel plates.

Note that in this embodiment, the embedded magnet type is illustrated as a representative example of the rotor structure; however, as long as there is a salient pole portion that is magnetically convex in the central part or between the poles, a surface magnet type may be used. The permanent magnets may be a rare earth magnet or a ferrite magnet.

The stator 13 includes an annular stator core 31, and a stator winding 36 having two sets of three phases, or in other words, six phases (U phase, V phase, W phase, X phase, Y phase, Z phase), wound around a plurality of slots 32 of the stator core 31. In this case, the stator winding 36 has two sets of three-phase symmetrical windings. The stator core 31 is configured by layering a plurality of annular electromagnetic steel plates in the axial direction and fixing them by caulking or the like. The stator core 31 has an annular yoke 33 and a plurality of teeth 34 extending radially inward from the yoke 33 and arranged at equal intervals in the circumferential direction, and a slot 32 is formed between adjacent teeth 34. The teeth 34 are provided at equal intervals in the circumferential direction.

In this embodiment, the rotating electric machine 10 has a 6-phase structure having 4 poles and 72 slots, and two sets of three-phase windings. In this case, the stator winding 36 is wound by full-pitch winding in series of 3 slots per 1 pole and 1 phase. Four conductors are inserted into each slot 32, and 12 conductors are connected in series per 1 pole and 1 phase. The stator core 31 is provided with 36 slots 32 in an electrical angle of 360 degrees (mechanical angle of 180 degrees), so the electrical angle per 1 slot is 10 degrees. One phase includes three consecutive slots, so in order to form a symmetrical three-phase winding, wiring is performed in the order of U+ phase, W− phase, and V+ phase every 6 slots. Moreover, the 3 slots existing between the U+ phase and the W− phase are the X+ phase constituting another set of symmetrical three-phase windings; and similarly, wiring is performed in the order of X+ phase, Z− phase, and Y+ phase every 6 slots. In short, two sets of three-phase windings of the stator winding 36 are wound around the stator 13 with an electrical angle that is different from each other by 30 degrees. Note that the number of poles, the number of phases, and the number of slots are not limited to this, and concentrated winding may be used under the condition that symmetric multiphase winding can be formed.

Figure 3:
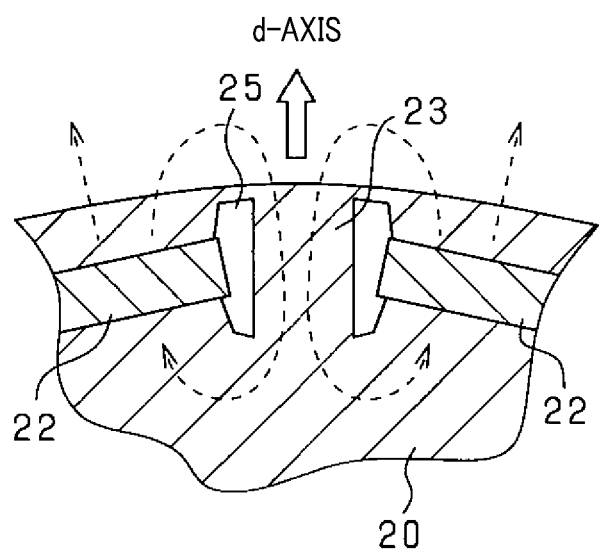
FIG. 3 is an explanatory diagram illustrating magnetic flux in the rotor.
Figure 4:
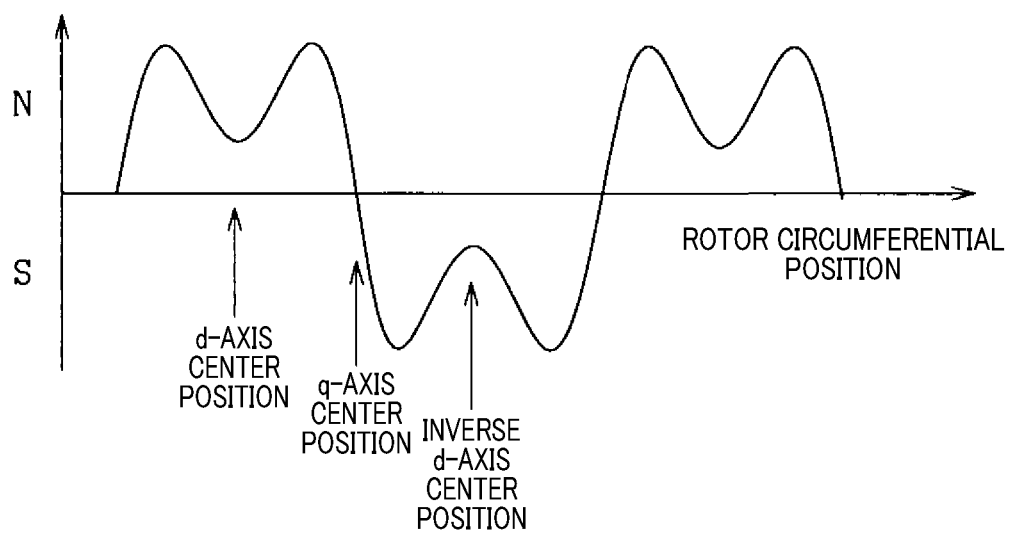
FIG. 4 is a diagram showing the magnetic field intensity distribution on the rotor surface.
Figure 5:
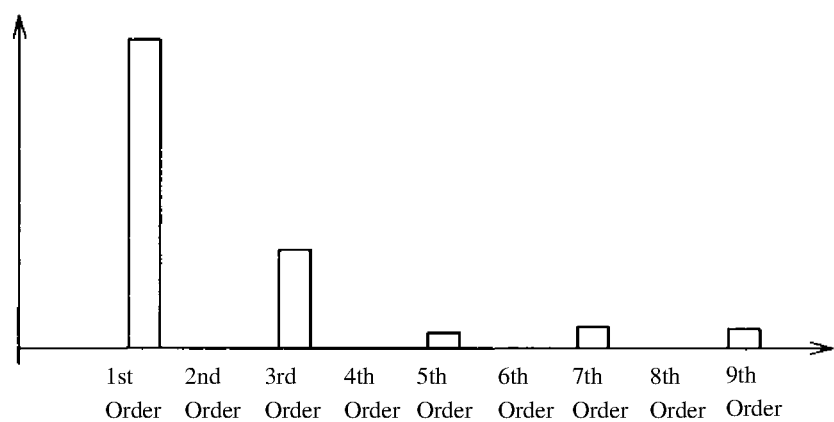
FIG. 5 is a diagram illustrating the results of FFT analysis.

In the rotating electric machine 10 having the above configuration, as illustrated in FIG. 3, magnetic flux that is generated by the permanent magnets 22 having the same magnetic polarity is distributed radially in the rotor 12; however, a part of the magnetic flux in the vicinity of the magnet end portion turns around so as to be absorbed by the salient pole portion 23 and self-shorts, and therefore, the magnetic field intensity at the pole center part decreases. In other words, the magnetic field intensity distribution on the rotor surface is as illustrated in FIG. 4, and it can be seen that third-order components exist as the magnetic field of the rotor 12. When the FFT analysis is actually performed, it can be confirmed that a considerable amount of a third-order harmonic component exists as illustrated in FIG. 5. When the rotor 12 rotates, this third-order magnetic field also rotates. In this case, although the rotational speed itself is synchronized with the fundamental wave, the spatial magnetic flux distribution is third order, so the fluctuation speed of the magnetic field is tripled.

Returning to FIG. 1, this system includes a first inverter 41 and a second inverter 42 provided for each of the two sets of three-phase windings, and a control device 50, and the energization current is adjusted for each phase in the stator winding 36 of each phase by the inverters 41, 42. The inverters 41, 42 are configured by a full bridge circuit having the same number of upper and lower arms as the number of phases of the phase winding, and each arm is provided with a respective switch (semiconductor switching element).

The control device 50 includes a microcomputer that includes a CPU and various memories, and performs energization control by turning ON and OFF each switch in the inverters 41, 42 based on detection information related to the rotating electric machine 10 and the inverters 41, 42, and whenever there is a powered running drive request and power generation request. The detection information related to the rotating electric machine 10 and the inverters 41, 42 includes, for example, a rotation angle (electrical angle information) of the rotor 12 detected by an angle detector such as a resolver or the like, a power supply voltage (inverter input voltage) detected by a voltage sensor, and an energization current of each phase detected by a current sensor. The control device 50 generates and outputs an operation signal for operating each switch of the inverters 41, 42.

In particular, the control device 50 performs energization control of the stator winding 36 so that a fundamental wave current having a fundamental frequency synchronized with the rotational speed of the rotor 12, and a harmonic current having triple the frequency of the fundamental frequency flow through the stator winding 36, and so that a stator magnetic field having a specified lead phase or delay phase with respect to the third-order magnetic field of the rotor 12 is generated by energization of the harmonic current. As a result, it is possible to extract the energy of the third-order harmonic magnetic field as an axial torque.

Figure 6:
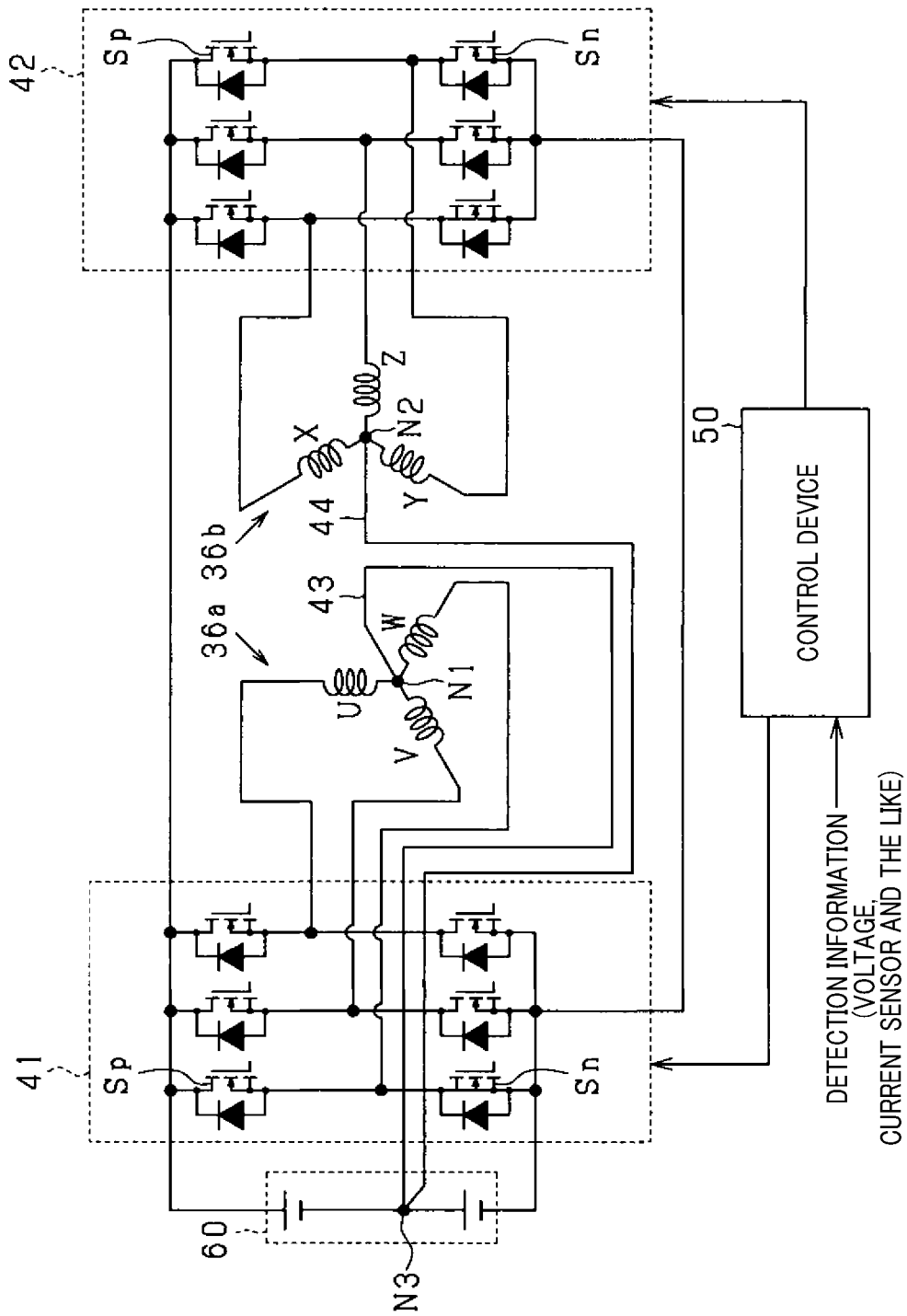
FIG. 6 is a circuit diagram illustrating an electrical configuration of the rotating electric machine system.

FIG. 6 is a circuit diagram illustrating an electrical configuration of the rotating electric machine system. In FIG. 6, two sets of three-phase windings 36a, 36b are illustrated as the stator winding 36, where the three-phase winding 36a includes a U-phase winding, a V-phase winding, and a W-phase winding, and the phase winding 36b includes an X-phase winding, a Y-phase winding, and a Z-phase winding.

As illustrated in FIG. 6, the first inverter 41 includes a series-connected body composed of an upper arm switch Sp and a lower arm switch Sn in three phases including a U phase, a V phase, and a W phase. The high potential side terminal of the upper arm switch Sp of each phase is connected to the positive terminal of a DC power supply 60, and the low potential side terminal of the lower arm switch Sn of each phase is connected to the negative terminal (ground) of the DC power supply 60. The DC power supply 60 is, for example, a storage battery with a rated voltage of 12V. In addition, the DC power supply 60 is a battery pack in which, for example, a plurality of single batteries are connected in series. Each of the switches Sp, Sn is a voltage control type semiconductor switching element, and more specifically, an N-channel MOSFET. A body diode is connected in antiparallel to each of the switches Sp, Sn. Note that an insulated gate bipolar transistor (IGBT) may be used instead of a MOSFET.

One end of each the U-phase winding, the V-phase winding, and the W-phase winding is connected to an intermediate connection point between the upper arm switch Sp and the lower arm switch Sn of each phase. These phase windings are connected in a star connection (Y connection), where the other ends of each the phase windings are connected to each other at a first neutral point N1.

The second inverter 42 has the same configuration as that of the first inverter 41, and includes a series-connected body composed of an upper arm switch Sp and a lower arm switch Sn in three phases including an X phase, a Y phase, and a Z phase. The high potential side terminal of the upper arm switch Sp of each phase is connected to the positive terminal of the DC power supply 60, and the low potential side terminal of the lower arm switch Sn of each phase is connected to the negative terminal (ground) of the DC power supply 60. One end of each the X-phase winding, the Y-phase winding, and the Z-phase winding is connected to an intermediate connection point between the upper arm switch Sp and the lower arm switch Sn of each phase. These phase windings are connected in a star connection (Y connection), and the other ends of the phase windings are connected to each other at a second neutral point N2.

The first neutral point N1 is connected to an intermediate point N3 of the DC power supply 60 via a neutral line 43. Moreover, the second neutral point N2 is connected to the intermediate point N3 of the DC power supply 60 via a neutral line 44. The intermediate point N3 is a position that is at an intermediate potential of the DC power supply 60, and in particular, is preferably a position where the voltage and the capacity are median values.

Figure 7:
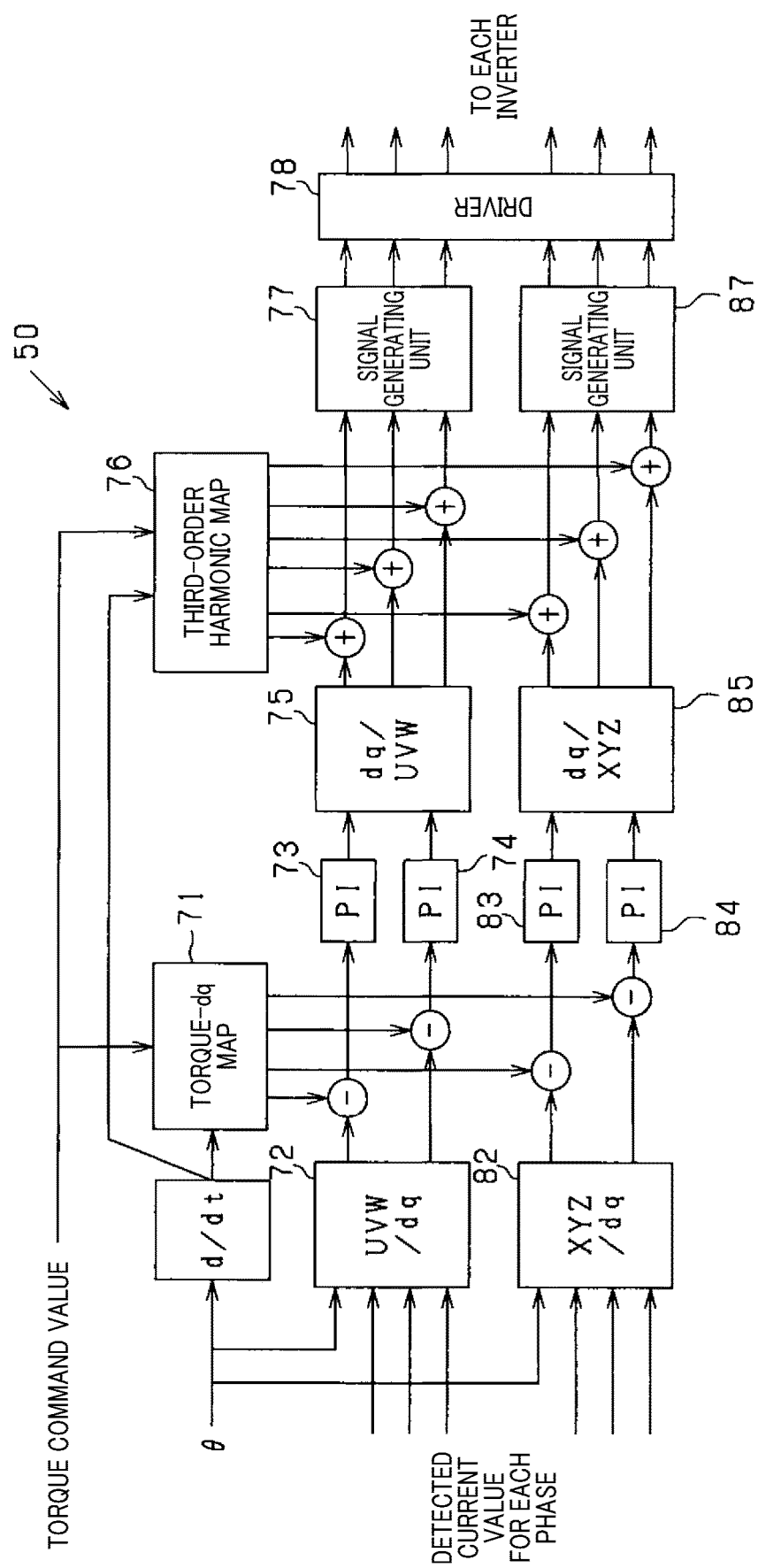
FIG. 7 is a functional block diagram illustrating control processing by a control device.

FIG. 7 is a functional block diagram illustrating a control process for controlling the rotating electric machine 10 by the control device 50. FIG. 7 illustrates a control process for controlling each phase current of the U, V, and W phases and a control process for controlling each phase current of the X, Y, and Z phases. Here, first, a control process for controlling the U, V, and W phases will be described.

In FIG. 7, a current command value setting unit 71 uses a torque-dq map, and sets a d-axis current command value and q-axis current command value based on a powered running torque command value or a power generation torque command value for the rotating electric machine 10, and the electrical angular velocity ω obtained by time derivative of the electrical angle θ. Note that the current command value setting unit 71 is provided in common on the U, V, W phase side and the X, Y, Z phase side.

The dq conversion unit 72 converts a detected current value (each phase current) by a current sensor provided for each phase into a d-axis current and a q-axis current as components of an orthogonal two-dimensional rotating coordinate system having the field direction as the d-axis.

A d-axis current feedback control unit 73 calculates a d-axis command voltage as an operation amount for performing feedback control of the d-axis current to the d-axis current command value. Moreover, a q-axis current feedback control unit 74 calculates a q-axis command voltage as an operation amount for performing feedback control of the q-axis current to the q-axis current command value. In each of these feedback control units 73, 74, the command voltage is calculated using the PI feedback method based on the deviation of the d-axis current and the q-axis current from the current command value.

A three-phase conversion unit 75 converts the d-axis and q-axis command voltages into U-phase, V-phase, and W-phase command voltages. Note that each of the units 71 to 75 described above is a feedback control unit for performing feedback control of the fundamental wave current according to dq conversion theory, and the U-phase, V-phase, and W-phase command voltages are feedback control values.

A third-order harmonic setting unit 76, using the third-order harmonic map, sets third harmonic components to be superimposed on the command voltages that have been obtained by three-phase conversion by the three-phase conversion unit 75 based on the torque command value and electrical angular velocity ω during powered running or power generation. Here, the phase and amplitude of the third-order harmonic current are set as third-order harmonic components. The phase is determined so that the magnetic field generated by the third-order harmonic current is on a specified lead phase side or delay phase angle side with respect to the third-order magnetic field of the rotor 12.

More specifically, in the third-order harmonic setting unit 76, in a case where powered running operation of the rotating electric machine 10 is performed, the phase of the third harmonic voltage (and consequently the third-order harmonic current) is determined so that a stator magnetic field having a specified lead phase within the electrical angle range of 15 to 45 degrees with respect to the third-order magnetic field of the rotor 12 is generated. More preferably, the lead phase has an electrical angle of 30 degrees. Note that the delay amount of the magnetic field with respect to the energization current may be taken into account.

In addition, in the third-order harmonic setting unit 76, in a case of generating power by the rotating electric machine 10, the phase of the third harmonic voltage (and consequently the third-order harmonic current) is determined so that a stator magnetic field having a specified delay phase within the electrical angle range of 15 to 45 degrees with respect to the third-order magnetic field of the rotor 12 is generated. More preferably, the delay phase has an electrical angle of 30 degrees. Note that the delay amount of the magnetic field with respect to the energization current may be taken into account.

Then, this third harmonic component is superimposed on the command voltage that has undergone three-phase conversion by the three-phase conversion unit 75 (corresponds to a third-order harmonic superimposing unit). As a result, a combined signal wave of the fundamental wave current and the third-order harmonic current is generated. Note that the third-order harmonic setting unit 76 is provided in common on the U, V, W phase side and the X, Y, Z phase side.

Then, an operation signal generating unit 77 generates an operation signal for the first inverter 41 based on a three-phase command voltage on which the third-order harmonic is superimposed using a known triangular wave carrier comparison method. More specifically, the operation signal generating unit 77 generates a switch operation signal (duty signal) for the upper and lower arms in each phase by performing PWM control based on a comparison of the magnitude of a signal obtained by standardizing the three-phase command voltage with a power supply voltage and a carrier signal such as a triangular wave signal or the like.

Moreover, the X, Y, and Z phase side has the same configuration, and the dq conversion unit 82 converts the detected current values (each phase current) detected by the current sensors into a d-axis current and a q-axis current, which are components of an orthogonal two-dimensional rotating coordinate system having the magnetic field direction as the d-axis.

The d-axis current feedback control unit 83 calculates the d-axis command voltage, and the q-axis current feedback control unit 84 calculates the q-axis command voltage. The three-phase conversion unit 85 converts the d-axis and q-axis command voltages into X-phase, Y-phase, and Z-phase command voltages. Then, the operation signal generating unit 87 generates operation signals for the second inverter 42 based on the three-phase command voltages on which the third-order harmonic is superimposed. More specifically, the operation signal generating unit 87 generates a switch operation signal (duty signal) for the upper and lower arms in each phase by performing PWM control based on a comparison of the magnitude of signals obtained by standardizing the three-phase command voltages with a power supply voltage and a carrier signal such as a triangular wave signal or the like.

A driver 78 turns ON and OFF the three-phase switches Sp and Sn in the inverters 41, 42 based on the switch operation signals generated by the operation signal generating unit 77 and 87.

In addition, in the rotating electric machine 10, the two sets of three-phase windings 36a, 36b are wound in the stator 13 as described above so as to be different from each other by 30 degrees in electrical angle, and the energization of each of these three-phase windings 36a, 36b is individually controlled by the inverters 41, 42. In this case, the control device 50 may perform energization control by causing the inverters 41, 42 to make the currents different from each other by 30 degrees in electrical angle. More specifically, in the third-order harmonic setting unit 76, for the third-order harmonic currents that flow in the three-phase winding 36a on the U, V, and W phase side and for the third-order harmonic currents that flow in the three-phase winding 36b on the X, Y, and Z phase side, it is preferable to make the current phases different by 30 degrees in electrical angle. By performing such control, the torque ripple (6-fold fluctuation component) due to the third-order harmonic is theoretically completely canceled as in Equation (4) above.

In a case where the phase of the third-order harmonic current is made different in each of the three-phase windings 36a, 36b, for example, preferably energization of the third-order harmonic current is controlled so that the third-harmonic magnetic field is advanced by 30 degrees (or delayed by 30 degrees) with respect to the third-order magnetic field of the rotor 12 in one three-phase winding 36a, and the third-order harmonic magnetic field is advanced by 60 degrees (or delayed by 60 degrees) with respect to the third-order magnetic field of the rotor 12 in the other three-phase winding 36b. Alternatively, energization of the third-order harmonic current may be controlled so that in one three-phase winding 36a, the third-order harmonic magnetic field is advanced by 30 degrees (or delayed by 30 degrees) with respect to the third-order magnetic field of the rotor 12, and in the other three-phase winding 36b, the third-order harmonic magnetic field is in phase with the third-order magnetic field of the rotor 12.

In short, for one of the two three-phase windings 36a, 36b, a third-order harmonic magnetic field having a specified lead phase (or delay phase) within an electrical angle range of 15 to 45 degrees with respect to the third-order magnetic field of the rotor 12 may be generated, and for the other, a third-order harmonic magnetic field having a specified lead phase (or delay phase) outside the electrical angle range of 15 to 45 degrees with respect to the third-order magnetic field of the rotor 12 may be generated. Note that a combination of an angle other than 30 degrees within the range of 15 degrees to 45 degrees and that angle ±30 degrees may be used.

In addition to the above, energization of the third-order harmonic current may be controlled so that the third-order harmonic magnetic field is advanced by 15 degrees (or delayed by 15 degrees) with respect to the third-order magnetic field of the rotor 12 in one three-phase winding 36a, and the third-order harmonic magnetic field is advanced by 45 degrees (or delayed by 45 degrees) with respect to the third-order magnetic field of the rotor 12 in the other three-phase winding 36b.

In the rotating electric machine system configured as described above, although the rotational speed of the rotor 12 is synchronized with the fundamental wave as described above, the fluctuation speed of the magnetic field is tripled since the spatial magnetic flux distribution is third order.

Moreover, as described above, the instantaneous values of the third-order harmonic currents are the same in each phase of each of the three-phase windings 36a and 36b. Therefore, when the third-order harmonic current flows into the neutral points N1, N2 from the windings of each phase, the third-order harmonic current flows out from the neutral wires 43, 44 and returns to the DC power supply 60. Alternatively, the third-order harmonic current flows into the neutral points N1 and N2 via the neutral wires 43, 44. In this case, as is well known, the three-phase combined magnetic field formed by the fundamental wave current rotates in accordance with the phase sequence with an intensity 1.5 times that of each phase magnetic field. By adjusting the rotation direction and the rotational speed to correspond to the rotation of the rotor 12, a fundamental wave torque is generated.

In the present embodiment, the third-order harmonic current is superimposed, however, the synthesized magnetic field due to the third-order harmonic current spatially becomes a standing wave as described above, and is a fluctuating magnetic field having an amplitude that fluctuates in time at triple speed. For example, during powered running operation of the rotating electric machine 10, the stator magnetic field is generated in a lead phase with respect to the rotor magnetic field, and preferably has a phase difference of 90 degrees on the third-order coordinate axis, or in other words, a fluctuating current flows that is the maximum current when the phase difference is 30 degrees on the fundamental wave coordinate axis ($\alpha=30$ degrees in Equation (3) above). In this case, the third-order magnetic field of the rotor 12 is pulled by the third-order fluctuating magnetic field and follows the third-order magnetic field of the stator 13. As a result, a torque having a positive average value that includes 6-fold harmonic ripple described in Equation (3) above is obtained.

In a case where the stator winding 36 is energized by a fundamental wave current and third-order harmonic current, there is an appropriate value for the ratio of the fundamental wave current and the third-order harmonic current, and preferably the ratio is approximately 50:50. However, it is possible to make the percentage of the third-order harmonic current larger or smaller than the fundamental wave current.

Figure 8A:
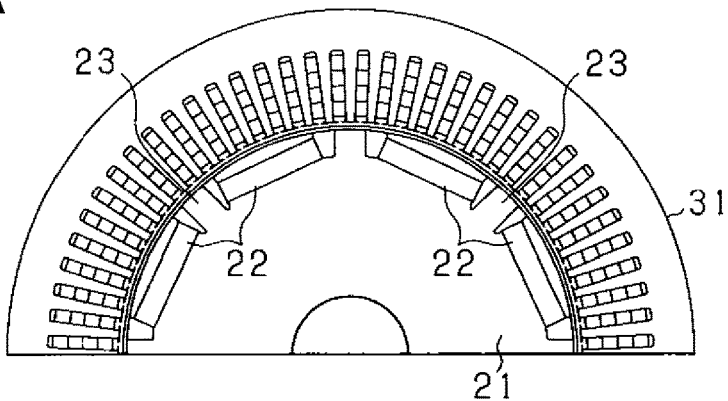
FIGS. 8A to 8C are diagrams illustrating the arrangement of two permanent magnets with one magnetic pole.
Figure 8B:
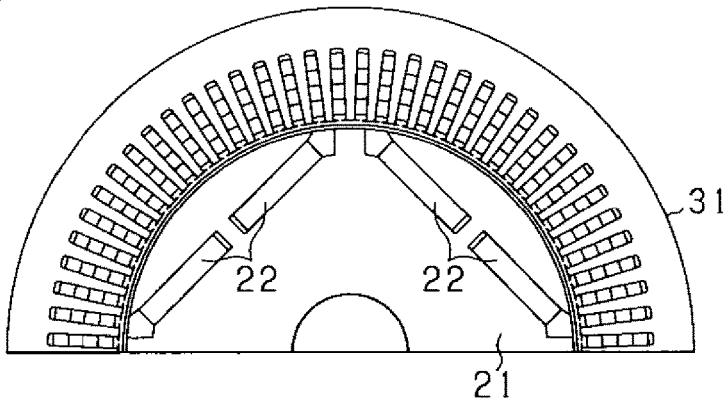
Figure 8C:
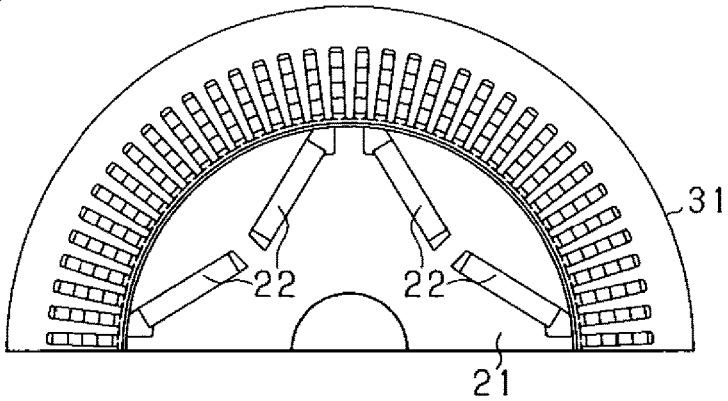

Possible arrangements of two permanent magnets 22 adjacent to one magnetic pole, may include:
an arrangement as illustrated in FIG. 8A in which the adjacent portions of each of the permanent magnets 22 are directed toward the outer peripheral side;
an arrangement as illustrated in FIG. 8B in which the permanent magnets 22 are arranged in a straight line; and
an arrangement as illustrated in FIG. 8C in which the portions of the permanent magnets 22 that are close to each other protrude toward the inner peripheral side.

Figure 8D:
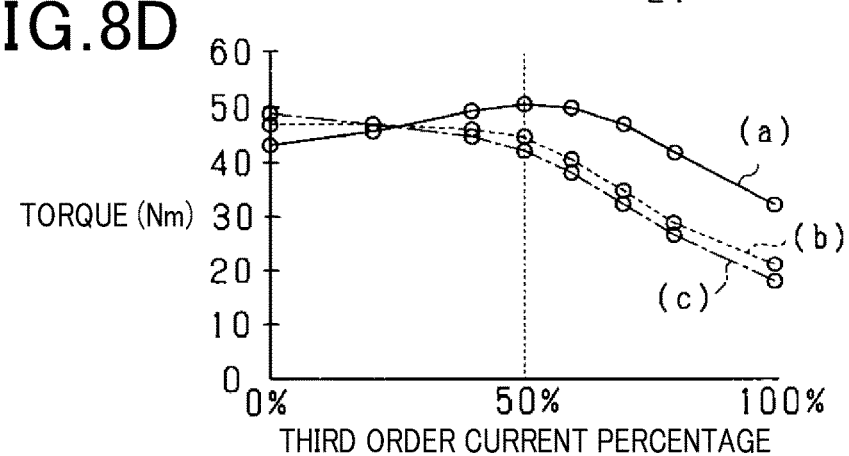
FIG. 8D is a diagram showing the relationship between the third-order current and torque.

In comparing FIGS. 8A to 8C, it can be confirmed that there is a difference in torque as illustrated in FIG. 8D, and, for example, when the ratio of the third-order harmonic current is 50%, it can be seen that the configuration illustrated in FIG. 8A is the best. As illustrated in FIG. 8A, in a case where the permanent magnets 22 are arranged so that the adjacent portions of the permanent magnets 22 protrude toward the outer peripheral side, the magnetic flux generated from both sides of the d-axis flows in a direction away from the d-axis. Therefore, a depression of the magnetic field intensity formed in the central portion of the rotor 12 becomes conspicuous, and the third-order harmonic magnetic field is enhanced.

According to the embodiment described in detail above, the following excellent effects can be obtained.

In the rotating electric machine 10 configured as described above, the salient pole portion 23 is provided in the central portion of the rotor 12 between the two permanent magnets 22 in one magnetic pole, so a third-order magnetic field is generated as the magnetic field of the rotor 12. Then, a fundamental wave current having a fundamental frequency synchronized with the rotational speed of the rotor 12 and a harmonic current that is triple the frequency of the fundamental frequency are passed through the stator winding 36, and a stator magnetic field having a specified lead phase or delay phase with respect to the third-order magnetic field of the rotor 12 is generated according to energization by the harmonic current. As a result, the energy of the third-order harmonic magnetic field can be effectively extracted as axial torque. Therefore, torque can be increased by just adding a time harmonic without increasing the size of the device.

In the case of powered running operation of the rotating electric machine 10, the energization of the stator winding 36 is controlled according to the third-order harmonic current so that a stator magnetic field having a specified lead phase within the range of 15 to 45 degrees in electrical angle with respect to the third-order magnetic field of the rotor 12 is generated. In this case, powered running operation of the rotating electric machine 10 can be appropriately performed by phase control of the third-order harmonic current.

In addition, in a case of performing power generation by the rotating electric machine 10, the energization of the stator winding 36 by the third-order harmonic current is controlled so that a stator magnetic field having a specified delay phase within a range of 15 to 45 degrees in electrical angle with respect to the third-order magnetic field of the rotor 12 is generated. In this case, the electric power generation by the rotating electrical machine 10 can be appropriately performed by phase control of the harmonic current.

The salient pole portion 23 is formed by forming convex portions on a plurality of electromagnetic steel plates constituting the rotor core 21, and by layering the respective convex portions of the plurality of electromagnetic steel plates. In other words, the salient pole portion 23 is integrally formed with the rotor core 21 as a laminated structure of a plurality of steel plates. As a result, the rotor core 21 with salient pole portion may be easily manufactured, and thus an economic effect may be obtained. Moreover, a salient pole portion 23 having an arbitrary shape may be easily manufactured.

In the rotor 12, in addition to the salient pole portions 23 in the central part (d-axis), a salient pole portion 24 that is magnetically convex in the radial direction is provided at a position 90 degrees in electrical angle from the salient pole portion 23, or in other words, a position that will be the q axis. In this case, since the stator magnetic field incident from the salient pole portion 23 on the d-axis side is emitted from the salient pole portion 24 on the q-axis side, the third-order magnetic flux can efficiently flow. Energization by the fundamental wave current bears the magnetic flux of the so-called reluctance torque component, so the effect of torque enhancement can be further enhanced.

Configuration is such that two permanent magnets 22 adjacent to each other in one magnetic pole are arranged in a direction such that portions of the permanent magnets 22 that are close to each other protrude toward the outer peripheral side. As a result, a depression of the magnetic field strength formed in the very central part of the rotor 12 becomes conspicuous, and the third-order harmonic magnetic field may be enhanced.

Configuration is such that in a case where a fundamental wave current and a third-order harmonic current are passed through the stator winding 36, third-order harmonic current flows through neutral wires 43, 44 connected to neutral points N1, N2 of the three-phase windings 36a, 36b. In this case, unlike in a configuration in which the third-order harmonic current flows between the positive and negative of the power source (for example, between UV windings), a third-order component appears in the interphase voltage. Therefore, it is possible to extract torque that is due to the third-order component.

Incidentally, in a case where the stator winding is delta-connected, the harmonic current becomes a circulating current, so the harmonic current cannot be controlled to a desired value.

Configuration is such that the neutral wires 43, 44 for each of the three-phase windings 36a, 36b are connected to an intermediate point N3 of the DC power supply 60 in which a plurality of batteries are connected in series. In this case, the third-order harmonic current can suitably flow through the neutral wires 43, 44 without using a switching element for controlling the third-order harmonic current flowing through the neutral wires 43, 44. In other words, a configuration that is advantageous from the aspect of cost may be achieved.

In the DC power supply 60, the voltage and the capacity on the positive side and the negative side from the intermediate point N3 are made equal to each other. In this case, the neutral wires 43, 44 of the three-phase windings 36a, 36b are connected to an intermediate point N3 where the voltage and capacity are equally distributed in the DC power supply 60, whereby a suitable configuration can be achieved in which the third-order harmonic current flows out or flows in via the neutral wires 43, 44.

Configuration is such that in the control device 50, the third-order harmonic component is superimposed on the feedback control values for each phase calculated based on the dq conversion theory (the command voltages of each phase outputted from the three-phase conversion units 75, 85 in FIG. 7). As a result, the third-order harmonic current may be controlled as desired.

Configuration is such that in the stator 13, two sets of three-phase windings 36a, 36b are wound being out of phase from each other by an electrical angle of 30 degrees, energization control is performed by making the one three-phase winding out of the two three-phase windings 36a, 36b out of phase with the other three-phase winding by an electrical angle of 30 degrees. As a result, it is possible to cancel the 6-fold torque fluctuation that is generated by the third-order harmonic current. Therefore, by superimposing the third-order harmonic current, it is possible to drive the rotating electric machine 10 while suppressing torque fluctuations and while enabling torque extraction.

Second Embodiment

Figure 9:
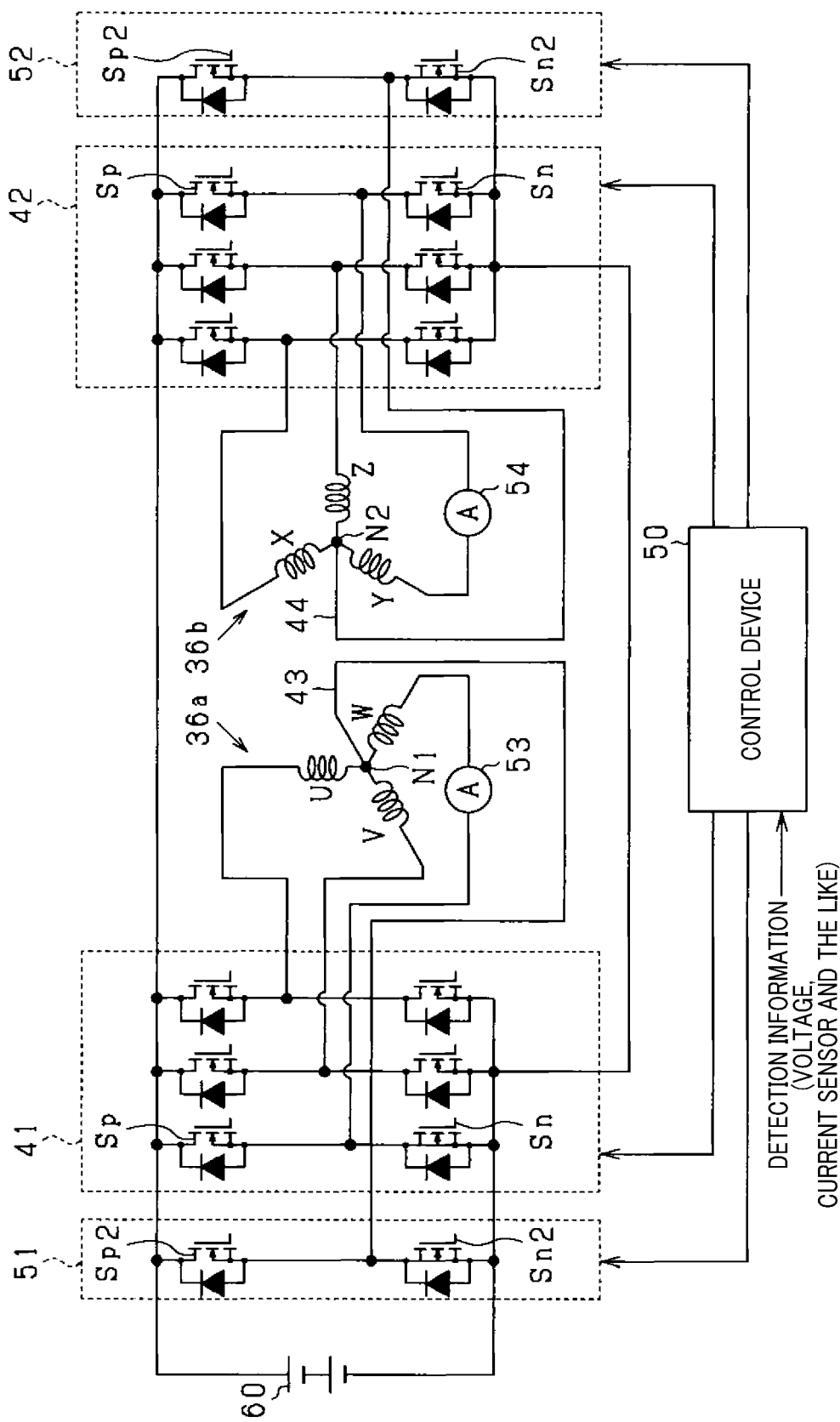
FIG. 9 is a circuit diagram illustrating an electrical configuration of the rotating electric machine system in a second embodiment.

In the following, a second embodiment will be described focusing on the differences from the first embodiment. FIG. 9 is a circuit diagram showing an electrical configuration of the rotating electric machine system in the present embodiment.

In FIG. 9, as a difference from the configuration of FIG. 6 described above, single-phase bridge circuits 51, 52, each including a series-connected body composed of an upper arm switch Sp2 and a lower arm switch Sn2 as a pair of switching elements, are connected at the neutral points N1, N2 of the three-phase windings 36a, 36b. The single-phase bridge circuits 51, 52 are respectively provided between the positive electrode side and the negative electrode side of the DC power supply 60, and neutral wires 43, 44 are connected to an intermediate point between the switches Sp2, Sn2. Each of the switches Sp2 and Sn2 may be a semiconductor switching element similar to the switches Sp and Sn of the inverters 41, 42, and is an N-channel MOSFET, for example. The neutral wires 43, 44 are provided with respective current sensors 53, 54 as current detecting units.

In addition to the energization control of the three-phase windings 36a, 36b by the inverters 41, 42, the control device 50 performs control of the third-order harmonic current by turning ON and OFF the switches Sp2 and Sn2 of the single-phase bridge circuits 51, 52. In this case, the fundamental wave current flows through the two sets of three-phase windings 36a, 36b according to the energization control of the inverters 41, 42, and the third-order harmonic current flows through the neutral wires 43, 44 according to the control of the single-phase bridge circuits 51, 52.

Note that it is also possible to integrally provide the single-phase bridge circuits 51, 52 with the inverters 41, 42. In this case, each of the inverters 41, 42 is configured as an 8-arm inverter.

FIG. 10 is a functional block diagram illustrating a control process by the control device 50 in the present embodiment. FIG. 10 illustrates a control process for controlling the fundamental wave current in the U, V, and W phases, a control process for controlling the fundamental current in the X, Y, and Z phases, and a control process for controlling the harmonic current. Note that the control process for controlling the fundamental wave current in the U, V, W phases, and the X, Y, Z phases has many common parts with the configuration of FIG. 7, so the same reference numbers are assigned to the same components in order to simplify the description.

In FIG. 10, the control device 50 includes a current command value setting unit 71 that sets a d-axis current command value and a q-axis current command value using a torque-dq map. Note that the control device 50 includes a dq conversion unit 72, a d-axis current feedback control unit 73, a q-axis current feedback control unit 74, a three-phase conversion unit 75, and an operation signal generating unit 77 as a configuration related to control processing on the U, V, and W phase sides. The operation signal generating unit 77 uses a known triangular wave carrier comparison method in the same way as in FIG. 7, however, differs in that an operation signal for the first inverter 41 is generated based on the three-phase command voltage (command voltage on which the third-order harmonic is not superimposed) that is outputted from the three-phase conversion unit 75.

Note that the control device 50 includes a dq conversion unit 82, a d-axis current feedback control unit 83, a q-axis current feedback control unit 84, a three-phase conversion unit 85, and an operation signal generating unit 87 as a configuration related to control processing on the U, V, and W phase sides. Similar to the operation signal generating unit 77, the operation signal generating unit 87 generates an operation signal for the second inverter 42 based on the three-phase command voltage that is outputted from the three-phase conversion unit 85.

A driver 78 turns ON and OFF the three-phase switches Sp and Sn in the inverters 41, 42 based on the switch operation signals generated by the operation signal generating unit 77 and 87. As a result, the fundamental wave current is controlled in each of the three-phase windings 36a, 36b.

Moreover, the control device 50 is provided with a third-order harmonic setting unit 91, feedback control units 92 and 93, and an operation signal generating unit 94 as a configuration for the control process of a harmonic current. The third-order harmonic setting unit 91, using a third-order harmonic map, sets the command value of the third-order harmonic current that flows through the neutral wires 43, 44 based on the torque command value and electrical angular velocity w during powered running or power generation. The amplitude and phase of the third-order harmonic current are set at this time.

More specifically, in the third-order harmonic setting unit 91, when powered running operation of the rotating electric machine 10 is being performed, the phase of the third-order harmonic current is determined so that a stator magnetic field having a specified lead phase within the range of 15 to 45 degrees in electrical angle with respect to the third-order magnetic field of the rotor 12 is generated. More preferably, the lead phase has an electrical angle of 30 degrees. Note that the delay amount of the magnetic field with respect to the energization current may be taken into account.

Moreover, in the third-order harmonic setting unit 91, when the rotating electric machine 10 is made to perform power generation, the phase of the third-order harmonic current is determined so that a stator magnetic field having a specified delay phase within the range of 15 to 45 degrees in electrical angle with respect to the third-order magnetic field of the rotor 12 is generated. More preferably, the delay phase has an electrical angle of 30 degrees. Note that the delay amount of the magnetic field with respect to the energization current may be taken into account.

Then, the feedback control units 92, 93 calculate a feedback command value for each of the three-phase windings 36a, 36b based on the deviations between the command value of the third-order harmonic current set by the third-order harmonic setting unit 91 and the detected current values (neutral line currents) detected by the current sensors 53, 54.

The operation signal generating unit 94 generates a switch operation signal in each single-phase bridge circuit 51, 52 based on the feedback command values. At this time, similar to the fundamental wave current control of each phase, it is preferable to generate the switch operation signal using a triangular wave carrier comparison method. As the triangular wave carrier signal, the same triangular wave carrier used for fundamental wave current control of each phase may be used in common.

The driver 95 turns ON/OFF the switches Sp2 and Sn2 of the upper and lower arms in the single-phase bridge circuits 51, 52 based on the switch operation signal generated by the operation signal generating unit 94.

Here, the neutral points N1, N2 are entrances and exits of the third-order harmonic current, and by controlling the switches Sp2, Sn2 of the single-phase bridge circuits 51, 52 with a sinusoidal PWM having a triple cycle, energization control is performed so that the third-order harmonic current returns to the power supply side.

In each of the three-phase windings 36a, 36b, the third-order harmonic current simultaneously flows in the same phase for each phase, so the energization timing (third-order harmonic current) of the neutral points N1, N2 is common for each phase. Therefore, the third-order harmonic current can be controlled by only a pair of upper and lower arms for each of the three-phase windings 36a, 36b. Note that the third-order harmonic current entering and exiting at the neutral points N1, N2 are the sum of the third-order harmonic current of the respective phases, so in the single-phase bridge circuits 51, 52, switching elements having a rating suitable for the single-phase bridge circuits 51, 52 may be selected.

In the present embodiment, configuration is such that single-phase bridge circuits 51, 52 for controlling the current flowing through the neutral wires 43, 44 are provided, and in addition to energization control of the three-phase windings 36a, 36b for each phase by the inverters 41, 42, third-order harmonic current control is performed by turning ON/OFF the switches Sp2, Sn2 of the single-phase bridge circuits 51, 52. In this case, the third-order harmonic current can be precisely controlled while directly observing the third-order harmonic current. In addition, unlike in the configuration in which the neutral wires 43, 44 are connected to an intermediate point of the DC power supply 60 (configuration in FIG. 6), restricting the connection of the DC power supply 60 may be eliminated.

Configuration is such that the third-order harmonic current flowing through the neutral wires 43, 44 is detected, feedback control of the third-order harmonic current is performed based on the deviations between the detected current value and the harmonic current command value set based on the torque command value. As a result, the third-order harmonic current can be controlled, and the control accuracy can be improved based on the third-order harmonic current that is actually flowing.

Note that in the case of a configuration in which the single-phase bridge circuits 51, 52 are integrally provided in the inverters 41, 42, a configuration for providing a plurality of switches Sp, Sn for controlling the fundamental wave current and a pair of switches Sp2, Sn2 for controlling the third-order harmonic current may be easily achieved. Therefore, it becomes possible to make the drive device more compact.

Other Embodiments

The embodiments described above may be changed as described below, for example.

In the above embodiments, the rotor 12 is configured so as to have the two permanent magnets 22 in one magnetic pole, however, this may be changed. For example, a configuration is possible in which four permanent magnets 22 are provided in one magnetic pole.

In the embodiments described above, the permanent magnet 22 used is a flat plate-shaped magnet having a linear cross section, however, this may be changed, and a curve-shaped magnet having a circular cross section may be used.

In the embodiments described above, a rotating electric machine 10 is used that has two three-phase windings 36a, 36b as the stator winding 36, however, the present invention is not limited to this, and the stator winding 36 may have one three-phase winding.

In the embodiments described above, a configuration is described in which the rotating electric machine is embodied as an inner rotor type (inner rotation type) multiphase AC motor, however, the present invention is not limited to this. For example, the rotating electric machine may be embodied as an outer rotor type (outer rotation type) multiphase AC motor. Moreover, configuration may be such that as the rotating electric machine an electric motor having only a powered running function among a powered running function and a power generation function is used, or such that a generator having only a power generation function is used.

The technique according to the present disclosure has been described with reference to the embodiments, however, it is understood that the technique according to the present disclosure is not limited to those embodiments and structures. The technique according to the present disclosure includes various modifications and modifications within an equivalent range. In addition, various combinations and forms, and furthermore, other combinations and forms including only one element or more or less, are also within the scope and spirit of the present disclosure.

(Conclusion)

In the rotating electric machine configured as described above, the salient pole portion is provided in the central portion of the rotor between the two permanent magnets in the one magnetic pole, so a third-order magnetic field is generated as the magnetic field of the rotor. Then, a fundamental wave current having a fundamental frequency synchronized with the rotational speed of the rotor and a harmonic current that is triple the frequency of the fundamental frequency are passed through the stator winding, and a stator magnetic field having a specified lead phase or delay phase with respect to the third-order magnetic field of the rotor is generated by energization by the harmonic current. As a result, the energy of the third-order harmonic magnetic field can be effectively extracted as axial torque. Therefore, torque can be increased by just adding time harmonics without increasing the size of the device.

The detailed principle will be described. In the rotating electric machine configured as described above, in the rotor, the magnetic flux of the permanent magnets on both sides of the salient pole portion at the center of the d axis is self-shorted through the salient pole portion, and the intensity of the central portion of the fundamental wave magnetic field is expressed by a magnetic field intensity distribution having an extremely depressed shape. This is considered to be the cause of the generation of the third-order harmonic magnetic field. In this case, the magnetic field generated by the permanent magnet in the rotor is a third-order rotating magnetic field that rotates along with the rotation of the rotor and mechanically rotates the stator surface. Since the magnetic field is a rotating magnetic field, it is considered that force may be extracted as torque by an induction effect by an appropriate current. In other words, it is considered that torque may be extracted by performing energization with a third-order fluctuation current that is synchronized with the third-order rotating magnetic field so as to follow Fleming's left-hand rule.

In general, the time waveform of each phase magnetic field due to the third-order harmonic current in a symmetric three-phase winding ideally matches perfectly to the instantaneous value, and it is a publicly known fact that, in terms of spatial phase, the time waveform becomes a fixed magnetic field, or in other words, a standing wave (refer to Equation (1)).

$$\Phi 3u(t)=\text{COS } 3\omega t$$

$$\Phi 3v(t)=\text{COS } 3(\omega t+2/3\pi)=\text{COS } 3\omega t$$

$$\Phi 3w(t)=\text{COS } 3(\omega t-2/3\pi)=\text{COS } 3\omega t$$

$$\Phi 3u(t)=V3v(t)=V3w(t) \quad (1)$$

In addition, the third-order magnetic field of the stator is a magnetic field, the spatial phase of which is fixed and the amplitude of which fluctuates at a triple speed in terms of time. Therefore, in a case where only a fundamental wave component is present in the rotating magnetic field on the rotor side, the generated force fluctuates in the third order, and it is a well-known fact that the average value of that force becomes zero (refer to Equation (2)).

$$\text{COS } \omega t \cdot \text{COS } 3\omega t=(\text{COS } 2\omega t+\text{COS } 4\omega t)/2 \quad (2)$$

The right side of Equation (2) are fluctuating components centered on zero with the average value thereof being zero. In other words, the force cannot be extracted as a torque that serves as a driving force.

However, when a magnetic field rotating in a certain period is present in the rotor, it is considered that the average value of the generated force is not zero due to flowing of a harmonic current synchronized with that period. In a case of a third-order rotating magnetic field, energization may be performed using a third-order fluctuation current. The force is not stable in time and fluctuates in 6-fold period, however, in a case where the phase to be energized is appropriate, the average value becomes positive.

The third-order magnetic field of the rotor is presumed to be a rotating magnetic field with an amplitude of 1 and a rotation period of 3ω, and is "Φ·COS 3ωt". The magnetic field of the stator current is presumed to be a fixed magnetic field, the amplitude of which fluctuates at a triple speed, and is "I·SIN 3(ωt+α)·1". In this case, the torque due to the two magnetic fields is expressed by the following equation (3).

$$\Phi \cdot I \cdot \text{COS } 3\omega t \cdot \text{SIN } 3(\omega t+\alpha)=\Phi \cdot I \cdot \{(1+\text{COS } 6\Omega t) \cdot \text{SIN } 3\alpha+\text{SIN } 6\omega t \cdot \text{COS } 3\alpha\}/2 \quad (3)$$

In Equation (3), the second term in the first term and the second term on the right side is a fluctuating component centered on zero. On the other hand, the first term includes a 6-fold period ripple, and the average value is a positive or negative fluctuating component. Therefore, due to the flowing of a harmonic current that is synchronized with the rotating magnetic field of the rotor, the energy of the third-order harmonic magnetic field may be extracted as axial torque in the rotating electrical machine.

Here, when α is 30 degrees, the second term on the right side of the equation (3) is zero, the first term is the maximum value, and the average value of the torque becomes "0.5Φ·I". In other words, the torque has a positive value. Presuming a case of performing powered running operation of the rotating electric machine, by performing energization by the harmonic current so that the stator magnetic field has a leading phase of 30 degrees in electrical angle with respect to the third-order magnetic field of the rotor, it becomes possible to extract the maximum powered running torque. In consideration of this point, as a second example, the control unit, in a case where powered running operation of the rotating electric machine is performed, controls energization of the stator winding by the harmonic current so that a stator magnetic field having a specified leading phase within a range of 15 to 45 degrees in electrical angle with respect to the third-order magnetic field of the rotor is generated.

Moreover, in a case of performing power generation by the rotating electric machine, by performing energization by the harmonic current so that the stator magnetic field has a delay phase of 30 degrees in electrical angle with respect to the third-order magnetic field of the rotor, it becomes possible to extract the maximum power generated torque. In consideration of this point, as a third example, the control unit, in a case of performing power generation by the rotating electric machine, controls energization of the stator winding by the harmonic current so that a stator magnetic field having a specified delay phase within a range of 15 to 45 degrees in electrical angle with respect to the third-order magnetic field of the rotor is generated.

In a fourth example, the rotor has a rotor core formed by layering a plurality of steel plates; a convex portion is formed on the steel plates; and the salient pole portion is formed by layering the convex portions of the plurality of steel plates.

With the configuration described above, the salient pole portion is integrally formed in the rotor core as a laminated structure of a plurality of steel plates. As a result, the rotor core with a salient pole portion may be easily manufactured, and thus an economic effect may be obtained. Moreover, a salient pole portion having an arbitrary shape may be easily manufactured.

In a fifth example, the rotor has a second salient pole portion that is magnetically convex in the radial direction at a position of 90 degrees in electrical angle from the salient pole portion.

With the configuration described above, the stator magnetic field incident from the salient pole portion on the upper d-axis side is emitted from the salient pole portion (second salient pole portion) on the q-axis side, so the third-order magnetic flux may efficiently flow. Energization by the fundamental wave current bears the magnetic flux of the so-called reluctance torque component, so the effect of torque enhancement can be further enhanced.

In a sixth example, two of the permanent magnets adjacent to each other in the one magnetic pole are arranged in such a direction that portions of these permanent magnets close to each other protrude toward an outer peripheral side.

With the configuration described above, by arranging the two permanent magnets in the one magnetic pole in such a direction that the adjacent portions of each permanent magnet protrude toward an outer peripheral side, the magnetic flux from both sides of the d-axis flows in a direction away from the d-axis. As a result, a depression of the magnetic field strength formed in the central part of the rotor becomes conspicuous, and the third-order harmonic magnetic field may be enhanced.

In a seventh example, the multiphase stator windings are connected in a star connection; and in a case where energization control of the fundamental wave current and the harmonic current is performed by the control unit, the harmonic current flows through neutral wires connected to neutral points of the stator winding.

The third-order harmonic current is the same for each phase in the case of a three-phase winding, so the third-order harmonic current flowing from the winding of each phase to a neutral point flows out via a neutral wire. Alternatively, the third-order harmonic current flows into a neutral point via a neutral wire. In this case, unlike in a configuration in which the third-order harmonic current flows between the positive and negative of the power source (for example, between UV windings), a third-order component appears in the interphase voltage. Therefore, it is possible to extract torque that is due to the third-order component.

In an eighth example, the neutral wires are connected to an intermediate point of a DC power supply in which a plurality of batteries is connected in series.

The neutral wires of the multiphase winding are configured so as to be connected to the intermediate point of the DC power supply in which multiple batteries are connected in series, so even without using switching elements for controlling the harmonic current flowing through the neutral wires, a harmonic current can suitably flow through the neutral wires. In other words, a configuration that is advantageous from the aspect of cost may be achieved.

In a ninth example, in the DC power supply, voltages and capacities on a positive side and a negative side from the intermediate point are equal to each other.

The neutral lines of the multiphase winding are connected to the intermediate point where the voltage and capacity are uniformly distributed in the DC power supply, whereby suitable configuration can be achieved for causing the harmonic current to flow out or flow in via the neutral wires.

In a tenth example, the control unit includes: a feedback control unit that calculates feedback control values for each phase of the stator winding based on deviation between a current command value set based on a torque command value and an actual current flowing through the stator winding; and a third-order harmonic superimposing unit that superimposes a harmonic component of triple the fundamental frequency on that feedback control value.

With the configuration described above, after the feedback control value is calculated based on the deviation of the winding current, the triple harmonic component is superimposed on that feedback control value. As a result, the third-order harmonic current may be controlled as desired.

In an eleventh example, a direct connection body composed of a pair of switching elements is connected between a positive electrode side and a negative electrode side of the DC power supply; the neutral lines are connected to an intermediate point between the pair of switching elements; and the control unit, in addition to performing energization control of the stator winding for each phase by the inverters, controls the harmonic current by turning ON and OFF the pair of switching elements.

With the configuration described above, harmonic current flowing through a neutral wire can be directly controlled by the pair of switching elements. In other words, the harmonic current can be precisely controlled while directly observing the harmonic current. In addition, configuration is such that the pair of switching elements are connected between the positive electrode side and the negative electrode side of the DC power supply, so, unlike the configuration in which the neutral line is connected to the intermediate point of the DC power supply, the restrictions on the connection of the DC power supply may be eliminated.

A twelfth example further includes current detecting units for detecting harmonic current flowing through the neutral wires; wherein the control unit performs feedback control of the harmonic current based on deviation between detected values of the harmonic current detected by the current detecting units, and a harmonic current command value set based on a torque command value.

With the configuration described above, the harmonic current can be controlled based on the harmonic current actually flowing, and the control accuracy can be improved.

In a thirteenth example, the inverters are provided with a plurality of switching elements for controlling the fundamental wave current for each phase of the stator winding, and the pair of switching elements.

With the configuration described above, a plurality of switching elements for controlling the fundamental wave current and a pair of switching elements for controlling the harmonic current are both provided in the inverters, so the drive device can be reduced in size.

In a fourteenth example, the stator winding has two sets of three-phase windings, and individual energization control is possible for each of the three-phase windings; the two sets of three-phase windings are wound in the stator at an electrical angle of 30 degrees different from each other; and the control unit performs energization control by making one three-phase winding of the two sets of three-phase windings out of phase with respect to the other three-phase winding by an electrical angle of 30 degrees.

With the configuration described above, it is possible to cancel the 6-fold torque fluctuation generated by the third-order harmonic current. As a result, it is possible to drive the rotating electric machine while suppressing the torque fluctuation, while allowing the torque to be extracted by superimposing the harmonic current.

In other words, the following Equation (4) is established by performing energization control in which two sets of three-phase windings are different in phase by an electrical angle of 30 degrees.

$$\Phi \cdot I \cdot \{(1+\cos 6\omega t)+(1+\cos 6(\omega t+30))\}/2 = \Phi \cdot I \quad (4)$$

According to equation (4), a torque ripple of 6-fold harmonics that are 30 degrees out of phase with each other are canceled out. As a result, the torque ripple (6-fold fluctuation component) due to the third-order harmonics is theoretically completely cancelled.

What is claimed is:

1. A rotating electric machine drive system comprising:
   a rotating electric machine equipped with: a rotor having one magnetic pole configured by a plurality of permanent magnets, and a salient pole portion that is magnetically convex in a radial direction in a central portion between the plurality of permanent magnets in the one magnetic pole; and a stator wound with a multiphase stator winding;
   an inverter for supplying electric power to the stator winding; and
   a control unit for controlling energization current of the inverters; wherein
   the control unit performs energization control of the stator winding such that a fundamental wave current at a fundamental frequency synchronized with a rotational speed of the rotor, and a harmonic current that is triple the fundamental frequency flow in the stator winding, and such that energization of the harmonic current generates a stator magnetic field having a specified lead phase or delay phase with respect to a third-order magnetic field of the rotor; and
   the control unit, in a case where powered running operation of the rotating electric machine is performed, controls energization of the stator winding by the harmonic current such that a stator magnetic field having a specified lead phase within a range of 15 to 45 degrees in electrical angle with respect to the third-order magnetic field of the rotor is generated.

2. The rotating electric machine drive system according to claim 1, wherein
   the control unit, in a case of performing power generation by the rotating electric machine, controls energization of the stator winding by the harmonic current such that a stator magnetic field having a specified delay phase within a range of 15 to 45 degrees in electrical angle with respect to the third-order magnetic field of the rotor is generated.

3. The rotating electric machine drive system according to claim 1, wherein
   the rotor has a rotor core formed by layering a plurality of steel plates;
   convex portion is formed on the steel plates; and
   the salient pole portion is formed by layering the convex portions of the plurality of steel plates.

4. The rotating electric machine drive system according to claim 1, wherein
   the rotor has a second salient pole portion that is magnetically convex in the radial direction at a position of 90 degrees in electrical angle from the salient pole portion.

5. The rotating electric machine drive system according to claim 1, wherein
   two of the permanent magnets adjacent to each other in the one magnetic pole are arranged in such a direction that portions of these permanent magnets close to each other protrude toward an outer peripheral side.

6. The rotating electric machine drive system according to claim 1, wherein
   the multiphase stator windings are connected in a star connection; and
   in a case where energization control of the fundamental wave current and the harmonic current is performed by the control unit, the harmonic current flows through neutral wires connected to neutral points of the stator winding.

7. The rotating electric machine drive system according to claim 6, wherein
   the neutral wires are connected to an intermediate point of a DC power supply in which a plurality of batteries is connected in series.

8. The rotating electric machine drive system according to claim 7, wherein
   in the DC power supply, voltages and capacities on a positive side and a negative side from the intermediate point are equal to each other.

9. The rotating electric machine drive system according to claim 7, wherein
   the control unit includes: a feedback control unit that calculates feedback control values for each phase of the stator winding based on deviation between a current command value set based on a torque command value and an actual current flowing through the stator winding; and a third-order harmonic superimposing unit that superimposes a harmonic component of triple the fundamental frequency on that feedback control value.

10. The rotating electric machine drive system according to claim 6, wherein
    a direct connection body composed of a pair of switching elements is connected between a positive electrode side and a negative electrode side of the DC power supply;
    the neutral lines are connected to an intermediate point between the pair of switching elements; and
    the control unit, in addition to performing energization control of the stator winding for each phase by the inverters, controls the harmonic current by turning ON and OFF the pair of switching elements.

11. The rotating electric machine drive system according to claim 10, further comprising
    current detecting units for detecting harmonic current flowing through the neutral wires; wherein
    the control unit performs feedback control of the harmonic current based on deviation between detected values of the harmonic current detected by the current detecting units, and harmonic current command value set based on a torque command value.

12. The rotating electric machine drive system according to claim 10, wherein
    the inverters are provided with a plurality of switching elements for controlling the fundamental wave current for each phase of the stator winding, and the pair of switching elements.

13. The rotating electric machine drive system according to claim 1, wherein the stator winding has two sets of three-phase windings, and individual energization control is possible for each of the three-phase windings;

the two sets of three-phase windings are wound in the stator at an electrical angle of 30 degrees different from each other; and the control unit performs energization control by making one three-phase winding of the two sets of three-phase windings out of phase with respect to the other three-phase winding by an electrical angle of 30 degrees.

14. A rotating electric machine drive system comprising:

a rotating electric machine equipped with: a rotor having one magnetic pole configured by a plurality of permanent magnets, and a salient pole portion that is magnetically convex in a radial direction in a central portion between the plurality of permanent magnets in the one magnetic pole; and a stator wound with a multiphase stator winding;

an inverter for supplying electric power to the stator winding; and a control unit for controlling energization current of the inverters; wherein the control unit performs energization control of the stator winding such that a fundamental wave current at a fundamental frequency synchronized with a rotational speed of the rotor, and a harmonic current that is triple the fundamental frequency flow in the stator winding, and such that energization of the harmonic current generates a stator magnetic field having a specified lead phase or delay phase with respect to a third-order magnetic field of the rotor; and the control unit, in a case of performing power generation by the rotating electric machine, controls energization of the stator winding by the harmonic current such that a stator magnetic field having a specified delay phase within a range of 15 to 45 degrees in electrical angle with respect to the third-order magnetic field of the rotor is generated.

* * * * *